United States Patent [19]

Moorehead

[11] 4,388,224

[45] Jun. 14, 1983

[54] MOLYBDENUM-EXCHANGED CRYSTALLINE ALUMINOSILICATE ZEOLITE

[75] Inventor: Eric L. Moorehead, Diamond Bar, Calif.

[73] Assignee: Union Oil Company of California, Los Angeles, Calif.

[21] Appl. No.: 286,359

[22] Filed: Jul. 23, 1981

Related U.S. Application Data

[63] Continuation of Ser. No. 81,005, Oct. 2, 1979, Pat. No. 4,297,243.

[51] Int. Cl.$^3$ .................. B01J 29/16; B01J 29/26; B01J 29/36
[52] U.S. Cl. .................. 252/455 Z; 252/439; 423/112
[58] Field of Search .................. 252/455 Z, 439; 208/111; 423/112

[56] References Cited

U.S. PATENT DOCUMENTS

| | | | |
|---|---|---|---|
| 3,013,988 | 12/1961 | Bukata et al. | 252/455 Z |
| 3,308,069 | 3/1967 | Wadlinger et al. | 252/455 Z |
| 3,794,598 | 2/1974 | Schlaffer | 252/455 Z |
| 3,839,228 | 10/1974 | Kirsch | 252/455 Z |
| 3,875,081 | 4/1975 | Young | 252/455 Z |
| 3,959,179 | 5/1976 | Mikovsky et al. | 252/455 Z |

FOREIGN PATENT DOCUMENTS 110835  12/1975  German Democratic Rep. .

OTHER PUBLICATIONS

Climax Molybdenum Company of Michigan, Document No. L-287-34, dated Nov. 19, 1976, Entitled "Preparation and Characterization of Zeolites Containing Exchanged Molybdenum" by Tsigdinos et al.

"Catalytic Properties of Molybdenum Zeolites in Epoxidation of Cyclohexene" by Dai et al., A Catalysis Society Meeting, Mar. 18-22, 1979, Chicago, Ill.

*Primary Examiner*—Carl F. Dees
*Attorney, Agent, or Firm*—Gregory F. Wirzbicki; Dean Sandford

[57] ABSTRACT

Molybdenum is ion exchanged into a crystalline aluminosilicate zeolite, replacing metals such as sodium, calcium, and potassium, by contacting the zeolite with an aqueous solution containing molybdenyl cations (i.e., $MoO_2^{2+}$) and having a pH below 7.0 but higher than that which would substantially affect the crystallinity of the zeolite. The resulting zeolite, when calcined or sulfided, is useful as a catalyst for hydrocarbon conversion reactions, particularly with respect to the hydrodealkylation of toluene to benzene and methane.

25 Claims, No Drawings

4,388,224

MOLYBDENUM-EXCHANGED CRYSTALLINE ALUMINOSILICATE ZEOLITE

This is a continuation of application Ser. No. 81,105, filed Oct. 2, 1979 now U.S. Pat. No. 4,297,243.

BACKGROUND OF THE INVENTION

This invention relates to a new composition of matter comprising crystalline aluminosilicate zeolites, and particularly to zeolites that have been ion exchanged so as to exchange the cations therein for other cations. More particularly, the invention relates to crystalline aluminosilicate zeolites having exchanged thereinto molybdenum-containing cations.

Crystalline aluminosilicate zeolites are well-known porous materials for drying gases, catalyzing hydrocarbon conversion reactions, and absorbing certain compounds in preference to others. Such zeolitic materials have an ordered crystalline structure and consist essentially of a crystal framework of $AlO_4$ and $SiO_4$ tetrahedra crosslinked by shared oxygen atoms. The electrovalence of the crystal framework is negative and is balanced by the presence of cations, usually metal cations or hydrogen cations. The empirical chemical formula for crystalline aluminosilicate zeolites may be expressed in terms of molar ratios of oxides as follows:

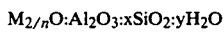

$$M_{2/n}O:Al_2O_3:xSiO_2:yH_2O$$

where $Al_2O_3$ and $SiO_2$ represent the $AlO_4$ and $SiO_4$ constituents making up the electronegative crystalline framework, $H_2O$ is the water of hydration, x and y are the number of moles of $SiO_2$ and $H_2O$, respectively, per mole of $Al_2O_3$ in the crystal framework, and $M_{2/n}O$ represents the components required to balance the negative charge of the crystalline aluminosilicate framework per mole of $Al_2O_3$ in the framework, with n being the cation valence of M.

Some crystalline aluminosilicate zeolites occur naturally. Chief among these are analcime, brewsterite, chabazite, clinoptilolite, erionite, faujasite, ferrierite, gismondine, gmelinite, mesolite, mordenite, natrolite, offretite, phillipsite, paulingite, scolecite, stilbite, and thomsonite. Many of the foregoing naturally-occurring zeolites may also be prepared synthetically. In addition, numerous synthetic zeolites are known, chief among which are the following listed with U.S. Patents that disclose methods for synthetically preparing such zeolites, said U.S. Patents being incorporated by reference herein: Zeolite A (U.S. Pat. No. 2,882,243), Zeolite B (U.S. Pat. No. 3,008,803), Zeolite F (U.S. Pat. No. 2,996,358), Zeolite H (U.S. Pat. No. 3,010,789), Zeolite L (U.S. Pat. No. 3,216,789), Zeolite T (U.S. Pat. No. 2,950,952), Zeolite W (U.S. Pat. No. 3,012,853), Zeolite X (U.S. Pat. No. 2,882,244), and Zeolite Y (U.S. Pat. No. 3,130,007). Many other synthetic zeolites may be prepared by methods known in the art, including, for example, Zeolite Omega, Zeolite ZSM-5, Zeolite ZSM-4, Zeolite P, Zeolite N, Zeolite D, Zeolite O, Zeolite S, and Zeolite Z.

One advantageous feature of virtually all crystalline aluminosilicate zeolites is that they are ion-exchangeable, that is, the cations in the zeolite that balance the electronegative charge of the crystalline framework are replaceable with other cations. Crystalline aluminosilicates, whether naturally-occurring or synthetically prepared, are usually in the sodium form, and it is often necessary to remove the sodium and replace it with other cations. For example, the sodium form of Zeolite Y proves inactive when used as a catalyst for cracking hydrocarbons, and as a result, it is desirable to replace the sodium with rare earth cations or hydrogen ions, or both, in order to stabilize the zeolite for catalytic cracking purposes. This may easily be accomplished by methods well-known in the art, and methods are known for ion-exchanging any of a number of metal-containing cations into a crystalline aluminosilicate. U.S. Pat. No. 3,013,982 discloses the ion exchange of nickel, silver, mercury, cadmium, lead, copper, iron, and thallium into crystalline aluminosilicates, U.S. Pat. No. 3,140,253 discloses rare earth-exchanged zeolites, U.S. Pat. No. 3,200,082 discloses copper, silver, gold, chromium, zinc, cadmium, lead, tin, cobalt, ruthenium, iron, nickel, rhodium, palladium, osmium, iridium, and platinum exchanged zeolites, U.S. Pat. No. 3,954,671 discloses manganese and alkaline earth metal exchanged zeolites, U.S. Pat. No. 3,969,276 discloses lithium, potassium, rubidium, cesium, beryllium, magnesium, calcium, strontium, barium, copper, and silver-exchanged zeolites, and U.S. Pat. No. 4,083,807 discloses antimony, bismuth, and manganese exchanged zeolites. In addition, it is also well-known that ammonium ions and hydrogen ions can be ion exchanged into a crystalline aluminosilicate zeolite (e.g., by the method taught in U.S. Pat. No. 3,130,006).

As should be apparent from the foregoing, virtually every common metal or semi-metal listed in the Periodic Table has been ion-exchanged into a crystalline aluminosilicate zeolite. One notable exception, however, is molybdenum. Despite many efforts to introduce molybdenum into crystalline aluminosilicate zeolites by ion exchange, there is still no successful method to ion exchange substantial amounts of molybdenum into aluminosilicate zeolites. The primary problem is that molybdenum is stable in aqueous media in the form of anionic species, such as $MoO_4^{-2}$ or $Mo_7O_{24}^{-6}$, and since the zeolite can only exchange cations, the impossibility of introducing such anionic species into an aluminosilicate by ion exchange is self-evident. Attempts to use cation forms of molybdenum have also proven unsuccessful, largely due to instability problems with molybdenum-containing cations and/or the difficulty in overcoming unfavorable ion exchange equilibria.

The main object of the invention, therefore, is to provide a crystalline aluminosilicate zeolite containing molybdenum in an ion-exchangeable form. A further object is to provide a method for ion exchanging molybdenum-containing cations into crystalline aluminosilicate zeolites. It is a further object to provide a composition of matter comprising a crystalline aluminosilicate zeolite having at least some of its ion exchange capacity satisfied with cations containing molybdenum. A specific object is to provide a molybdenum-exchanged Zeolite Y and a method for preparing such a Zeolite Y. It is yet another object of the invention to utilize molybdenum-exchanged crystalline aluminosilicate zeolites in oxide or sulfided forms as catalysts for dealkylating toluene and/or alkylated naphthenes, for cracking hydrocarbons, and for hydrocracking hydrocarbons. These and other objects and advantages will become clear to those skilled in the relevant art from the following description of the invention.

SUMMARY OF THE INVENTION

In accordance with the present invention, molybdenum-containing cations are introduced into a crystalline aluminosilicate zeolite by contacting the zeolite with an aqueous solution containing molybdenyl cations ($MoO_2^{+2}$) or a precursor of molybdenyl cations while maintaining the pH of the solution with added organic base below 7.0 but higher than that which would substantially affect the crystallinity of the zeolite. When subsequently calcined, as by subjecting the zeolite containing exchanged molybdenum-containing cations to elevated temperatures in the presence of an oxygen-containing atmosphere, the zeolite proves useful as a catalyst for dealkylating toluene or dealkylating alkylated naphthenes. Alternatively, the molybdenum-containing zeolite may be subjected to an elevated temperature and a reducing atmosphere containing sulfur vapor, sulfur compounds, or both, to produce a dealkylating catalyst containing molybdenum components in the form of compounds of molybdenum and sulfur. Such catalysts are also useful for upgrading hydrocarbons, as by catalytic cracking or hydrocracking a hydrocarbon fluid to yield a product hydrocarbon of lower average molecular weight and lower average boiling point.

The zeolitic compositions produced by contacting a crystalline aluminosilicate zeolite with a pH controlled, $MoO_2^{+2}$-containing solution may be expressed in terms of molar ratios of oxides by the empirical formula:

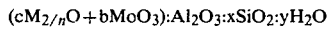

$$(cM_{2/n}O + bMoO_3):Al_2O_3:xSiO_2:yH_2O$$

where $cM_{2/n}O$ represents the sum of all components, on a per mole of $Al_2O_3$ in the crystal framework basis, required to balance that portion of the charge on the crystal framework not balanced by molybdenum constituents, with the valance of M being represented by n, and where $MoO_3$ represents all molybdenum constituents balancing a charge on the crystal framework, and c, b, x, and y represent the moles of $M_{2/n}O$, $MoO_3$, $SiO_2$, and the water of hydration, $H_2O$, respectively, present in the zeolite to each mole of $Al_2O_3$ in the crystal framework, x being between 2 and 100, y being a non-negative number, c being 0 or a positive number less than 1, and b being a positive number no greater than 1, with c+b being a positive number no greater than 1.

The molybdenum-containing zeolites of the invention can be described as crystalline aluminosilicate zeolites having at least some of their ion exchange capacity satisfied with cations containing molybdenum. They may further be described as crystalline aluminosilicate zeolites having ordered crystalline structures and containing ion-exchangeable molybdenum-containing cations. In one embodiment, the crystalline aluminosilicate of the invention has a silicon dioxide to aluminum trioxide molar ratio in the crystal framework of at least 2:1, and further has at least a portion of the electronegative charge on the crystal framework balanced by a cation containing molybdenum. In yet another embodiment, the crystalline aluminosilicate zeolite has an ordered crystal structure and contains at least 0.01 equivalent of molybdenum-containing cations per gram atom of aluminum in the electronegative crystal framework.

It is important to note that the composition of the invention differs radically from the compositions taught in the many prior art patents relating to catalysts comprising molybdenum components intimately combined with crystalline aluminosilicate zeolites. The prior art is replete with teachings of catalysts prepared by incorporating molybdenum compounds onto a support material comprising a crystalline aluminosilicate zeolite. In general, such methods involve contacting the zeolite with a liquid solution having dissolved therein a compound containing molybdenum in anionic form. In the usual instance, the catalyst is prepared by impregnating a zeolite with an aqueous solution of ammonium heptamolybdate, following which the resulting composite is calcined to convert impregnated molybdenum components to one or more molybdenum oxides. The resulting catalyst differs from the compositions of the invention in that the molybdenum oxide is supported on the aluminosilicate zeolite; no molybdenum is introduced into the zeolite by ion exchange with the one or more cations associated with the $AlO_4$ tetrahedron. Similarly, as taught in U.S. Pat. No. 3,013,988, it is known in the art to sublime a molybdenum compound, e.g., molybdenum carbonyl ($Mo(CO)_6$) or molybdenum pentachloride ($MoCl_5$), into a zeolite, but in such a sublimation method essentially no ion exchange takes place. Molybdenum is merely adsorbed on the zeolite, and cannot be removed by back ion-exchange.

The critical, distinguishing feature of the zeolites of the invention, therefore, is the reversibility of the ion exchange, that is, that the molybdenum contained in the zeolite is removable by back ion exchange. Most of the contained molybdenum, and usually substantially all of the contained molybdenum, may be removed by ion exchange from the compositions prepared by the method of the invention by immersion in an aqueous salt solution of essentially neutral pH.

DETAILED DESCRIPTION OF THE INVENTION

The present invention is based on the discovery that, under conditions designed to insure the presence of substantial proportions of $MoO_2^{+2}$ cations in an aqueous medium also containing an organic base, molybdenum-containing cations in said aqueous medium can be ion exchanged into a crystalline aluminosilicate zeolite, replacing metal cations, hydrogen ions, ammonium ions, and other cations with molybdenum-containing cations. Natural and synthetic crystalline aluminosilicates suitable for treatment by the method of the invention have a silicon dioxide to aluminum trioxide molar ratio in the crystal framework of at least 2:1, more suitably at least 3:1. The suitable zeolites are further characterized by resistance to crystal collapse at a pH of 6.0, with the preferred zeolites being stable in acids having a pH of 5.0, and with the most especially preferred zeolites being stable in acids having a pH as low as 3.5. To permit the ion exchange of the $MoO_2^{+2}$ cation, the preferred zeolites are not only acid resistant but also have a substantial number of pores of relatively large pore diameter, usually above 5.0 Angstroms and preferably above 6.0 Angstroms. Thus, an acid resistant but small pore zeolite such as mordenite is a suitable zeolite whereas zeolites selected from the group consisting of Zeolite Y, Zeolite L, Zeolite ZSM-4, Zeolite ZSM-5, Zeolite T, Zeolite Omega, erionite, faujasite, and modifications of the foregoing, such as Zeolite Y in its stabilized and ultrastabilized forms, are preferred in the invention due to their acid resistance and the size of their pores. The more highly preferred zeolites have substantially all of their pores of relatively uniform diameter greater than 5.0 Angstroms, and more preferably still, greater than 6.0 Angstroms. The most highly preferred zeolite is Zeolite Y, a crystalline aluminosilicate zeolite having a silicon dioxide to aluminum trioxide molar ratio in its crystal framework of between about 3:1 and 6:1 and a pore size of about 8 to 10 Angstroms, depending upon the metal cation balancing the electronegative charge on the crystal framework.

In accordance with the invention, a crystalline aluminosilicate zeolite, such as sodium Y zeolite, is contacted with an aqueous solution containing a dissolved molybdenyl cation ($MoO_2^{+2}$) precursor. Suitable molybdenyl cation precursors include $MoO_2Cl_2$ (molybdenum dioxydichloride), $MoO_2F_2$ (molybdenum dioxydifluoride), and $MoO_2Br_2$ (molybdenum dioxydibromide), with $MoO_2Cl_2$ being most preferred because of its ready availability. Also present in the solution is sufficient of an added organic base to maintain the pH of the solution, which would otherwise fall to extremely low levels due to the acidity of the molybdenum precursor, to a value lower than 7.0 but higher than that which would substantially affect the crystallinity of the zeolite. The most useful organic bases are the aliphatic and aromatic amines, with amines such as pyridine, piperidine, piperazine, quinoline, and derivatives thereof being especially suitable. The most preferred bases are those having a $K_b$ above $1.0 \times 10^{-10}$, with pyridine ($K_b = 2.3 \times 10^{-9}$) being the most highly preferred.

A molybdenum-exchanged crystalline aluminosilicate zeolite is produced when an aluminosilicate zeolite is contacted with an aqueous solution containing at least about 0.5% by weight, preferably 1.0 to about 5.0% by weight, of molybdenum dioxydichloride or other dissolved molydenyl cation precursor. The weight ratio of the solution to the zeolite during contacting is usually at least 1:1, preferably between 3:1 to about 10:1. In the preferred embodiment, the pH of the solution in contact with the zeolite is maintained by addition of an organic base to a value between about 0.2 and about 1.0 pH units above that which would produce substantial loss of crystallinity. A preferred pH range when ion exchanging sodium Zeolite Y is 3.3-4.3.

The critical feature of the invention resides in the conditions employed during the contacting of zeolite and solution. It has been found that the molybdenyl cation does not exist for substantial periods of time in aqueous media. Molybdenyl cations are believed to decompose in the presence of water, most probably by the following hydrolysis reaction:

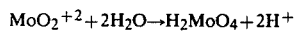

$$MoO_2^{+2} + 2H_2O \rightarrow H_2MoO_4 + 2H^+$$

The stability of molybdenyl cations is both time and pH dependent, with a pH above 5.0 causing rapid decomposition and a pH in the 3.0 to 4.0 range usually effecting substantial loss of molybdenyl cations in about three to about ten minutes. Thus, aqueous solutions in which molybdenum dioxydichloride (or other molybdenyl cation precursors) is dissolved must be utilized relatively soon after preparation, and preferably they are used immediately after preparation. In the preferred embodiment of the invention, the zeolite is immersed in water and heated to about 50°–85° C., following which the pH is adjusted to the desired acidity with added acid. Solid, anhydrous molybdenum dioxydichloride is then added to the heated mixture along with an appropriate organic base to maintain the pH at the desired level. Adding the molybdenum dioxydichloride in solid form insures that the zeolite contacts a solution containing a substantial proportion of molybdenyl cations and that the molybdenyl cations will exist for a time period sufficient to effect the ion exchange. In an alternative embodiment, the $MoO_2Cl_2$ precursor may be added as a constituent dissolved in an anhydrous, aprotic, polar organic solvent, such as pyridine, dimethylformamide, dimethylsulfoxide, and N-methylpyrollidone. Also alternatively, but less preferably, the molybdenum dioxydichloride may be dissolved in an aqueous medium and then quickly utilized before the $MoO_2^{+2}$ cation has a chance to hydrolyze. In general, conditions must be chosen such that the zeolite is in contact with a substantial proportion of molybdenyl cations for a time period sufficient to exchange molybdenum cations into the zeolite but insufficient to effect substantial decomposition of the molybdenyl cation in the solution.

The preferred solution contacted with the zeolite contains hydrogen ions and molybdenyl cations as essentially the only inorganic cations therein. In the preferred embodiment, therefore, the molybdenyl cation exchanges with the sodium or other metal in the zeolite while minimizing competition with other ion exchange reactions. The composition produced by the ion exchange technique of the invention is believed to contain molybdenyl cations at the ion exchange sites, but the entry of other cations of molybdenum into the zeolite, or the transformation of molybdenyl cation to other cations once the molybdenyl cation enters the zeolite, is also within the scope of the invention.

The amount of molybdenum-containing cations exchanged into a crystalline aluminosilicate zeolite by the method of the invention is usually such that at least 1% of the ion exchange capacity, preferably at least 10% of the ion exchange capacity, is satisfied with cations containing molybdenum. In an alternative embodiment of the invention, the crystalline aluminosilicate zeolite produced by the method described herein usually has at least 0.01, preferably at least 0.10, equivalent of molybdenum-containing cations per gram atom of aluminum in the electronegative crystal framework.

Ion exchange with molybdenum cations is usually such that less than 100% of the ion exchange sites are satisfied with cations containing molybdenum. Usually, only about 10 to about 50% of the available ion exchange sites are occupied with molybdenum-containing cations, the remaining cations in the zeolite consisting essentially of hydrogen ions and metal or other cations of a kind as were originally present in the zeolite.

In the case of sodium Y zeolite, the introduction of molybdenum-containing cations into the zeolite is observable by slight color change. Contacting sodium Y zeolite under preferred conditions with pyridine as the organic base and molybdenum dioxydichloride as the molybdenyl ion precursor results in the conversion of the white sodium zeolite to a zeolite with a yellowish-green tinge. The yellow-green color indicates the presence of molybdenum in the zeolite. This has been proven by standard emission spectroscopy analysis. Emission spectroscopic analysis has also proven that the sodium content of the zeolite decreases while the molybdenum content increases during the ion exchange treatment, thereby establishing that molybdenum-containing cations replace the sodium cations in the zeolite.

The ion exchange of molybdenum-containing cations into crystalline aluminosilicate zeolites by the method of the invention is reversible. It has been found, for example, that the molybdenum content of molybdenum-exchanged Zeolite Y can be reduced and the sodium content increased by immersing the zeolite for at least one hour at a temperature in the range of 20° to 80° C. into an aqueous sodium salt solution, such as an aqueous sodium chloride solution, having an initial pH in the range of 6.0 to 8.5 and containing sodium ions in a concentration between 1.0 and 15% by weight, calculated as Na, with the immersion being such that the weight ratio of zeolite to solution is between about 1:4 and 1:12. During such treatment, the yellow-green color of the zeolite has been observed to disappear, with the solution then turning yellow-green and the zeolite returning to the original white color of sodium Zeolite Y. Also, when the white zeolite is subjected to X-ray diffraction analysis, it has been found that the 533 and 620 Miller indices reflections are such that the ratio of the relative intensity of the 533 Miller indice to that of the 620 Miller indice substantially drops in comparison to the original molybdenum-exchanged zeolite, thereby evidencing the removal of heavy metal cations from the zeolite.

The following Example illustrates one method in accordance with the invention for introducing molybdenum-containing cations into a crystalline aluminosilicate zeolite. The Example, however, is not to be construed as limiting the scope of the invention, which is defined by the claims.

EXAMPLE I

A molybdenum-exchanged crystalline zeolite was prepared in accordance with the invention in the following manner: Sodium Y zeolite (10 gm) was placed in a beaker containing 40 ml distilled water. The initial pH of the liquid in contact with the zeolite was 10.2. The liquid and zeolite were then heated to 65° C. with continuous stirring while dilute hydrochloric acid was added to lower the pH to 4.0 to 4.2. Stirring was continued and the temperature was maintained at 65° C. for 15 to 20 minutes, after which time 1.2 ml pyridine was added. Since the pyridine addition resulted in an increase in pH to above 6.0, dilute hydrochloric acid was again added to lower the pH to 3.7. Then 0.60 gm molybdenum dioxydichloride in solid form was slowly added with stirring while pyridine was added dropwise to maintain the pH between 3.7 and 4.0. The total time of simultaneous addition of molybdenum dioxydichloride and pyridine was about 5 to about 10 minutes. A yellow-green slurry formed in the beaker and was stirred at 65° C. for 45 minutes. The slurry was then separated by filtration into a liquid filtrate and a yellow-green molecular sieve zeolite. The yellow-green color of the zeolite was retained after washing in water and drying in air.

When subjected to X-ray diffraction analysis, the 533 and 620 Miller indices were such that the ratio of the intensity of the 533 indice to that of the 620 indice was 7.7. This compares to a 533:620 Miller indices ratio of 4.5 in the original sodium Y zeolite, thereby evidencing the introduction of a heavy metal-containing cation into the zeolite.

The following experiment was performed to demonstrate the back ion exchange properties of the zeolites of the invention:

EXAMPLE II

A yellow-green molybdenum-exchanged zeolite was prepared in a manner similar to that described in Example I. The sodium zeolite Y from which the molybdenum-exchanged zeolite was produced had the chemical and physical characteristics (as determined by emission spectroscopy and X-ray diffraction analyses) shown in the first column of Table I. After molybdenum had been introduced into the zeolite, the zeolite was again subjected to emission spectroscopy and X-ray diffraction analyses, and the results so obtained are shown in the second column of Table I. The molybdenum-exchanged zeolite was then subjected to ion exchange by the following treatment: about 10 gm of the zeolite was placed in a beaker into which was introduced about 50 ml of an aqueous solution containing about 10 gm of sodium acetate in hydrated form. The beaker was then heated to about 75° C. and, with stirring, held at that temperature for about one and one-half hours. The zeolite was then separated from the solution by filtration, and it was noted that the filtrate was yellow-green and the zeolite was white. After drying, the zeolite was again subjected to emission spectroscopy analysis and X-ray diffraction analysis. These results are recorded in the third column of Table I.

The results shown in the Table clearly indicate that the molybdenum cations in the crystalline aluminosilicate zeolite of the invention are removable by ion exchange. The data in the third column of the Table indicate that back ion exchange is possible to restore the zeolite to its original sodium form. The increase in crystallinity and the decrease in the Miller indices 533/620 ratio between the zeolite of the second column and that of the first are consistent with the loss of a heavy metal from the zeolitic framework. Further proof of the capability of the zeolites of the invention to undergo back ion exchange to remove molybdenum-containing cations from the ion exchange sites is the drop in molybdenum content of the zeolite from 5% by weight to 523 ppmw.

TABLE I

|  | Na-Y-Zeolite | Mo-Y-Zeolite | Back Ion Exchanged Zeolite |
|---|---|---|---|
| Color | White | Yellow-Green | White |
| % Crystallinity | 98 | 89 | 99 |
| Miller Indices 533/620 Ratio | 4.5 | 9.6 | 6.67 |
| Sodium Content, wt. % as Na | 7.32 | 2.78 | 8.77 |
| Molybdenum Content, wt. % as Mo | <0.001 | 5.00 | 0.0523 |

Zeolites prepared in accordance with the invention have been found to be effective catalysts for the catalytic conversion of hydrocarbons, and particularly for the dealkylation or hydrodealkylation of either toluene to benzene or alkylated naphthenes to dealkylated naphthenes. Under conventional dealkylating conditions, such as 900° to about 1200° F. operating temperature, 50 to about 10,000 v/v/hr space velocity (calculated at 1 atm. and 25° C.), 5 to about 1000 psig operating pressure, and 0 to about 1000 psia hydrogen partial pressure, the dealkylation of toluene can be achieved in the presence of catalysts prepared from molybdenum-exchanged zeolites with yields between about 50 and about 70% or better, depending upon choice of conditions and zeolite. For dealkylating alkylated naphthenes, high yields of dealkylated naphthenes are obtainable under the conditions just set forth with respect to dealkylating toluene.

When using a molybdenum-exchanged zeolite herein as a dealkylation catalyst, the zeolite is ordinarily calcined or sulfided prior to use. Calcination to convert the molybdenum-containing cations to one or more molybdenum oxides is achieved by contacting the zeolite with oxygen under oxidizing conditions at an elevated temperature, usually above 500° F., preferably above 900° F. Similarly, sulfiding may be accomplished by contacting either a calcined or uncalcined molybdenum-exchanged zeolite with sulfur or sulfur-containing compounds (particularly $H_2S$) under conditions of elevated temperature and a reducing environment so as to convert the molybdenum-containing cations in the zeolite to one or more molybdenum sulfides or other compounds of molybdenum and sulfur.

The following comparison Example demonstrates the high activity for dealkylating and hydrodealkylating of a calcined molybdenum-exchanged Y zeolite.

EXAMPLE III

A sample of powdered, yellow-green, molybdenum-exchanged (about 33% exchanged) zeolite prepared in a manner similar to that of Example I was admixed with silica (Ludox) such that silica comprised between about 15 and 20% of the mixture. The resulting composite was dried, calcined in air for two hours at 500° C., and then crushed to particulates of 15 to 20 mesh.

A 5 ml sample of the catalyst particles just described was charged into a reactor to test its effectiveness as a dealkylating and hydrodealkylating catalyst. Gaseous feed compositions consisting of hydrogen and toluene or nitrogen and toluene were passed at atmospheric pressure through said reactor under the conditions reported in Table II for Experiments Nos. 1 through 5. The results obtained are tabulated in Table II. As is self-evident from the data, whereas the sodium Y zeolite evidenced no activity for hydrodealkylation, the molybdenum-exchanged zeolite exhibited substantial activity for the dealkylation and hydrodealkylation of hydrocarbons and for selectively producing benzene from toluene.

hydrogenation component (the molybdenum in the zeolite being the first) is ordinarily not necessary, although the presence of a second such component, especially for purposes of paraffin isomerization, may sometimes be desirable. For catalytic cracking, the preferred compositions comprise about 2 to 25 weight percent of the zeolite component and 75 to about 98 weight percent of a refractory oxide component, e.g., alumina or silica-alumina. In fluid catalytic cracking processes employing such catalysts, conventional conditions in the riser of about 950° to 1050° F. operating temperature and 0 to about 50 psig operating pressure may be employed.

The compositions herein in either the calcined or sulfided form are particularly useful for hydrocracking, especially when composited with one or more hydrogenation components selected from the metals, oxides, and sulfides of uranium and the Group VIII and Group VIB elements of the Periodic Table. Such components may be composited by intimate admixture with the molybdenum-exchanged zeolites herein in the same manner as is conventional for other zeolites used for hydrocracking purposes, e.g., impregnation or comulling followed by calcination and/or sulfiding. Suitable proportions of added hydrogenation components range from about 0.1 to about 30 percent by weight (as the metal), depending upon the metal or metals selected and the desired activity. In the case of the noble metals, proportions may range from about 0.1 to about 2.0 percent by weight whereas in the case of the iron group metals (iron, cobalt, and nickel), proportions of about 1 to about 10 percent are normally employed. Particularly preferred hydrogenating metals for use herein are platinum, palladium, nickel, tungsten, and cobalt. Molybdenum may also be added as a hydrogenation component by impregnation, comulling, and the like so that the resulting hydrogenation catalyst contains molybdenum components supported on the zeolite as well as molybdenum components that have been ion exchanged thereinto.

For hydrocracking purposes, the present compositions with or without added hydrogenation components

TABLE II

| Exp. No. | Feed Composition | Catalyst | Temp., °F. | GHSV, Calc. @ 1 atm., and 25° C. | % Conversion | Products Distribution | | |
|---|---|---|---|---|---|---|---|---|
| | | | | | | % $CH_4$ | % Benzene | % Xylene |
| 1 | 95% Hydrogen 5% Toluene | Mo-Zeolite Y | 980 | 180 | 15 | 20 | 80 | 0 |
| 2 | 95% Hydrogen 5% Toluene | Mo-Zeolite Y | 980 | 90 | 37 | 42 | 58 | 0 |
| 3 | 95% Hydrogen 5% Toluene | Mo-Zeolite Y | 980 | 45 | 41 | 72 | 28 | 0 |
| 4 | 95% Nitrogen 5% Toluene | Mo-Zeolite Y | 980 | 90 | 43 | 8 | 85 | 7 |
| 5 | 95% Nitrogen 5% Toluene | Mo-Zeolite Y | 1050 | 90 | 63 | 8 | 85 | 7 |
| 6 | 95% Hydrogen 5% Toluene | Na-Zeolite Y | 980 | 180 | 0 | 0 | 0 | 0 |

The data presented in Table II also provides evidence that the present compositions exhibit catalytic activity for hydrocracking (Experiments Nos. 1 through 3) and for catalytic cracking (Experiments Nos. 4 and 5). Due to the high acidity when hydrogen ions are present along with molybdenum-containing ions in the zeolite, the zeolites are useful in either the calcined or sulfided form for a variety of acid catalyzed hydrocarbon conversion reactions, including, for example, catalytic cracking, isomerization of n-paraffins to isoparaffins, isomerization of alkyl aromatics, alkylation, and transalkylation of alkyl aromatics. For these purposes a second will normally be utilized to hydrocrack a mineral oil fraction boiling between 200° F. and 1400° F., preferably between 350° and about 1200° F. Suitable hydrocracking conditions include such conventional operating ranges as 450° to about 850° F. operating temperature, 400 to about 3000 psig operating pressure, 0.2 to about 10 liquid hourly space velocity, and an $H_2$/Oil ratio of 0.5 to about 15 MSCF/bbl. Similar conditions may be employed for hydrodenitrogenation, hydrodesulfurization, hydrotreating, etc.

Although the invention has been described with reference to comparison and illustrative examples, many variations, modifications, and alternatives of the invention as described will be apparent to those skilled in the art. Accordingly, it is intended to embrace within the invention all such variations, modifications, and alternatives as fall within the spirit and scope of the following claims.

I claim:

1. A crystalline aluminosilicate zeolite having at least some of its ion exchange capacity satisfied with cations containing molybdenum.

2. A crystalline aluminosilicate zeolite having at least some of its ion exchange capacity satisfied with molybdenyl ions.

3. A crystalline aluminosilicate zeolite having a silicon dioxide to aluminum trioxide molar ratio in the crystal framework of at least 2:1, and further having at least a portion of the electronegative charge on the crystal framework balanced by cations containing molybdenum.

4. A zeolite as defined in claim 3 wherein said charge on the crystal framework is balanced, at least in part, by molybdenum-containing cations and one or more cations selected from the group consisting of alkali metal cations and hydrogen cations.

5. A zeolite as defined in claim 3 wherein said silicon dioxide to aluminum trioxide molar ratio is between about 3:1 and 6:1.

6. A zeolite as defined in claim 3 wherein most of the cations containing molybdenum are removable by ion exchange.

7. A crystalline aluminosilicate zeolite having a composition expressed in molar ratios of oxides as:

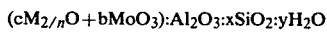

$(cM_{2/n}O + bMoO_3):Al_2O_3:xSiO_2:yH_2O$ where $cM_{2/n}O$ represents the sum of all components, on a per mole of $Al_2O_3$ in the crystal framework basis, required to balance that portion of the charge on the crystal framework not balanced by molybdenum constituents, with the valence of M being represented by n, and where $MoO_3$ represents all molybdenum constituents balancing a charge on the crystal framework, and c, b, x, and y represent the moles of $M_{2/n}O$, $MoO_3$, $SiO_2$, and the water of hydration, $H_2O$, respectively, present in the zeolite to each mole of $Al_2O_3$ in the crystal framework, x being between 2 and 100, y being a non-negative number, c being 0 or a positive number less than 1, and b being a positive number no greater than 1, with c+b being a positive number no greater than 1.

8. A zeolite as defined in claim 7 wherein x is greater than 3.

9. A zeolite as defined in claim 7 wherein x is between 3 and 6.

10. A crystalline aluminosilicate zeolite having an ordered crystalline structure having at least 0.01 equivalent of molybdenum-containing cations per gram atom of aluminum in the electronegative crystal framework.

11. A crystalline aluminosilicate zeolite as defined in claim 10 having at least 0.10 equivalent of molybdenum-containing cations per gram atom of aluminum in the electronegative crystal framework.

12. A crystalline aluminosilicate zeolite as defined in claim 10, wherein said zeolite has a crystal framework and an ordered crystalline structure of a zeolite selected from the group consisting of Zeolite Y, Zeolite L, Zeolite ZSM-4, Zeolite ZSM-5, Zeolite T, Zeolite Omega, erionite, and faujasite.

13. A crystalline aluminosilicate zeolite having an ordered crystalline structure and containing ion-exchangeable molybdenum-containing cations.

14. A crystalline aluminosilicate zeolite as defined in claim 13 having at least 0.10 equivalent of molybdenum-containing cations per gram atom of aluminum.

15. A zeolite as defined in claims 1, 2, 3, 4, 5, or 6 wherein said cations containing molybdenum are present in a proportion of at least 0.10 equivalent per gram atom of aluminum in the electronegative crystal framework.

16. A zeolite as defined in claim 15 wherein essentially all of said cations containing molybdenum consist of molybdenum and oxygen.

17. A zeolite as defined in claim 16 wherein that portion of the electronegative crystal framework not balanced by cations of molybdenum are balanced essentially completely by cations selected from the group consisting of hydrogen ions, sodium ions, and combinations thereof.

18. A crystalline aluminosilicate zeolite having at least 10% of its ion exchange capacity satisfied with cations containing molybdenum, with most of said cations being removable by ion exchange.

19. A crystalline aluminosilicate zeolite having between 10 and 50% of its ion exchange capacity satisfied with cations containing molybdenum, with most of said cations being removable by ion exchange.

20. A crystalline aluminosilicate zeolite having between 10 and 50% of its ion exchange capacity satisfied with cations containing, as essentially the only metal therein, molybdenum, with most of said cations containing molybdenum being removable by ion exchange.

21. A zeolite as defined in claim 18, 19, or 20 wherein essentially all of said cations containing molybdenum consist of molybdenum and oxygen.

22. A zeolite as defined in claim 21 wherein that portion of the electronegative crystal framework not balanced by said cations containing molybdenum are balanced essentially completely by cations selected from the group consisting of hydrogen ions, alkali metal ions, or mixtures thereof.

23. A zeolite as defined in claim 22 wherein any alkali metal cations balancing the electronegative crystal framework are essentially completely in the form of sodium ions.

24. A catalyst composition comprising a calcined, intimate admixture of (1) one or more hydrogenation components selected from the group consisting of uranium and the Group VIB and Group VIII metals and the compounds thereof, and (2) a crystalline aluminosilicate zeolite containing molybdenum-containing cations in ion-exchangeable form.

25. A catalyst composition comprising a sulfided, intimate admixture of (1) one or more hydrogenation components selected from the group consisting of uranium and the Group VIB and Group VIII metals and the compounds thereof and (2) a crystalline aluminosilicate zeolite containing molybdenum-containing cations in ion-exchangeable form.

* * * * *

UNITED STATES PATENT AND TRADEMARK OFFICE
CERTIFICATE OF CORRECTION

PATENT NO. : 4,388,224

DATED : June 14, 1983

INVENTOR(S) : Eric L. Moorehead

It is certified that error appears in the above-identified patent and that said Letters Patent is hereby corrected as shown below:

The term of this patent subsequent to October 27, 1998, has been disclaimed.

Signed and Sealed this

Second Day of August 1983

[SEAL]

Attest:

GERALD J. MOSSINGHOFF

Attesting Officer

Commissioner of Patents and Trademarks